(12) United States Patent
Wu et al.

(10) Patent No.: US 11,556,499 B2
(45) Date of Patent: Jan. 17, 2023

(54) CONTAINER IMAGE MIGRATION SERVICE

(71) Applicant: INTERNATIONAL BUSINESS MACHINES CORPORATION, Armonk, NY (US)

(72) Inventors: Wei Wu, Beijing (CN); Peng Hui Jiang, Beijing (CN); Jin Shi, Xinzhou Road (CN); Jun Su, Beijing (CN); Xiong Wei Zhao, Beijing (CN); Jing Yan Ma, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 15 days.

(21) Appl. No.: 17/154,254

(22) Filed: Jan. 21, 2021

(65) Prior Publication Data
US 2022/0229804 A1 Jul. 21, 2022

(51) Int. Cl.
*G06F 7/00* (2006.01)
*G06F 16/11* (2019.01)
*G06F 16/18* (2019.01)

(52) U.S. Cl.
CPC ........ *G06F 16/119* (2019.01); *G06F 16/1873* (2019.01)

(58) Field of Classification Search
CPC .............. G06F 16/1873; G06F 16/219; G06F 16/2336; G06F 16/2329; G06F 16/119
See application file for complete search history.

(56) References Cited

U.S. PATENT DOCUMENTS 9,122,562 B1* 9/2015 Stickle .................. G06F 9/5077
9,983,891 B1* 5/2018 Christensen ............. G06F 8/63
10,768,973 B1* 9/2020 Jin .......................... G06F 16/178
10,990,365 B2* 4/2021 Burgazzoli .............. G06F 16/51
2016/0350105 A1* 12/2016 Kumar ....................... G06F 8/71
2017/0034023 A1* 2/2017 Nickolov ............ H04L 43/0817
(Continued)

FOREIGN PATENT DOCUMENTS

CN          107577475 B       2/2020
WO        2018197928 A1      11/2018

OTHER PUBLICATIONS

Mell et al., "The NIST Definition of Cloud Computing", National Institute of Standards and Technology, Special Publication 800-145, Sep. 2011, 7 pages.

*Primary Examiner* — Mohammed R Uddin
(74) *Attorney, Agent, or Firm* — Robert R. Aragona

(57) ABSTRACT

A method, system and computer program product for container image migration service is provided. The method comprises identifying a latest version of a first customer container image stored in a container image repository. The method further comprises determining the latest version of the first customer container image is a migration image from a last version of the first customer container image; determining a set of commands in the Docker file of the last version of the first customer container image that have migrated to a corresponding set of commands in the Docker file of the migration image; identifying a latest version of a second customer container image having at least one Docker file command in common with at least one command in the set of commands; and recommending imminent migration of the second customer container image to include migration of the at least one Docker file command.

20 Claims, 12 Drawing Sheets

(56) References Cited

U.S. PATENT DOCUMENTS

| | | | |
|---|---|---|---|
| 2017/0177860 A1* | 6/2017 | Suarez | G06F 9/45558 |
| 2017/0180346 A1* | 6/2017 | Suarez | G06F 21/53 |
| 2017/0264684 A1* | 9/2017 | Spillane | G06F 9/45558 |
| 2018/0349150 A1* | 12/2018 | Wong | G06F 9/4493 |
| 2019/0108048 A1 | 4/2019 | Chen | |
| 2019/0114164 A1* | 4/2019 | Wong | G06F 8/658 |
| 2019/0243628 A1* | 8/2019 | Goldmann | G06F 8/63 |
| 2019/0253523 A1* | 8/2019 | Raduchel | H04L 67/306 |
| 2020/0082095 A1* | 3/2020 | Mcallister | G06F 11/323 |
| 2020/0125352 A1* | 4/2020 | Kannan | G06F 8/65 |
| 2020/0241867 A1* | 7/2020 | Gainsborough | G06F 8/63 |
| 2021/0286640 A1* | 9/2021 | Zengerle | G06F 9/45558 |

* cited by examiner

700

- 710 IDENTIFY A LATEST VERSION OF A FIRST CUSTOMER CONTAINER IMAGE STORED IN AN IMAGE REPOSITORY
- 720 DETERMINE THE LATEST VERSION OF THE FIRST CUSTOMER CONTAINER IMAGE IS A MIGRATION IMAGE FROM A LAST VERSION OF THE FIRST CUSTOMER IMAGE
- 730 DETERMINE A SET OF COMMANDS IN THE DOCKER FILE OF THE LAST VERSION OF THE FIRST CUSTOMER CONTAINER IMAGE THAT HAVE MIGRATED TO MIGRATED COMMANDS IN THE DOCKER FILE OF THE MIGRATED IMAGE
- 740 IDENTIFY A LATEST VERSION OF A SECOND CUSTOMER CONTAINER IMAGE HAVING AT LEAST ONE DOCKER FILE COMMAND IN COMMON WITH AT LEAST ONE COMMAND IN THE SET OF COMMANDS
- 750 RECOMMENDING IMMINENT MIGRATION OF THE SECOND CUSTOMER CONTAINER IMAGE TO INCLUDE MIGRATION OF THE AT LEAST ONE DOCKER FILE COMMAND

FIG. 7A

CONTAINER IMAGE MIGRATION SERVICE

BACKGROUND

The present invention relates to container image maintenance, and more specifically, to a method, product and system for migration of container images in a cloud image repository.

Public cloud service providers usually provide a standard container repository to store different container images. A first tier container image is a service provider container image. The service provider container image may consist of a number of functional layers including a kernel layer, middleware layers and infrastructure software layers. A second tier container image is a customer container image owned by the user of the public cloud service. The customer container image may consist of a number of functional layers including a kernel layer, middleware layers and application layers. The customer container image is dependent on the service provider container image in a sense that the latter is created on the basis of the former.

The service provider container image may be created based on some other functional image called a base image. If the base image is changed, the service provider container image will be updated. Consequently, the customer container image has to be updated accordingly.

SUMMARY

Embodiments of the invention include a method. The method comprises identifying a latest version of a first customer container image stored in a container image repository. The method also comprises determining the latest version of the first customer container image is a migration image from a last version of the first customer container image. The method further comprises determining a set of commands in the Docker file of the last version of the first customer container image that have migrated to a corresponding set of commands in the Docker file of the migration image. The method also comprises identifying a latest version of a second customer container image having at least one Docker file command in common with at least one command in the set of commands. The method further comprises recommending imminent migration of the second customer container image to include migration of the at least one Docker file command.

Embodiments of the invention further include a system. The system includes a processor and a memory containing a program that, when executed on the processor, performs an operation. The operation comprises identifying a latest version of a first customer container image stored in a container image repository. The operation also comprises determining the latest version of the first customer container image is a migration image from a last version of the first customer container image. The operation further comprises determining a set of commands in the Docker file of the last version of the first customer container image that have migrated to a corresponding set of commands in the Docker file of the migration image. The operation also comprises identifying a latest version of a second customer container image having at least one Docker file command in common with at least one command in the set of commands. The operation further comprises recommending imminent migration of the second customer container image to include migration of the at least one Docker file command.

Embodiments of the invention further include a non-transitory computer program product, including a computer-readable storage medium having computer-readable program code embodied therewith, the computer-readable program code executable by one or more computer processors to perform an operation. The operation comprises identifying a latest version of a first customer container image stored in a container image repository. The operation also comprises determining the latest version of the first customer container image is a migration image from a last version of the first customer container image. The operation further comprises determining a set of commands in the Docker file of the last version of the first customer container image that have migrated to a corresponding set of commands in the Docker file of the migration image. The operation also comprises identifying a latest version of a second customer container image having at least one Docker file command in common with at least one command in the set of commands. The operation further comprises recommending imminent migration of the second customer container image to include migration of the at least one Docker file command.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

FIG. 7A is a flowchart of a general process of a method according to an embodiment of the invention.

DETAILED DESCRIPTION

Figure 1:
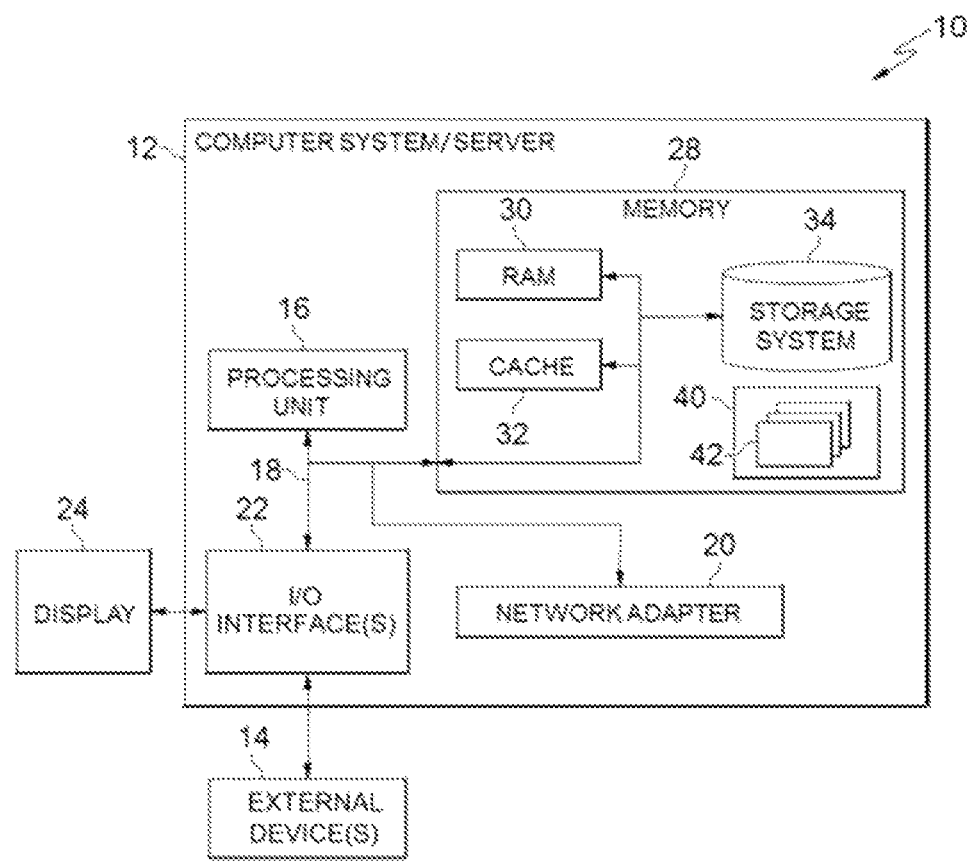
FIG. 1 depicts a cloud computing node according to an embodiment of the present invention.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
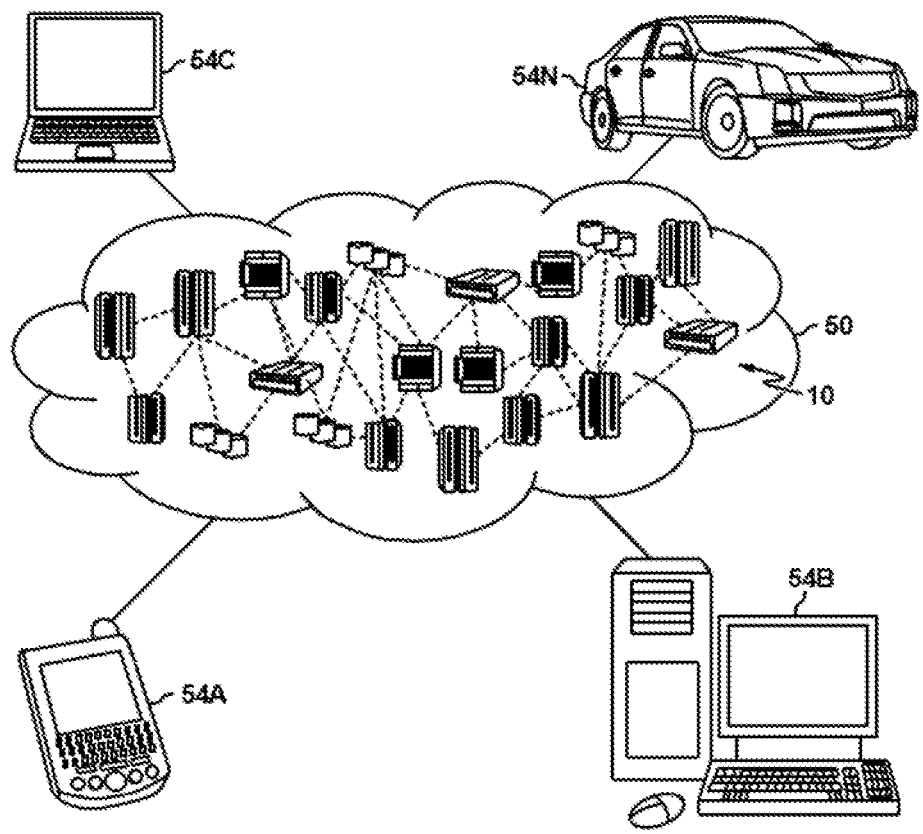
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
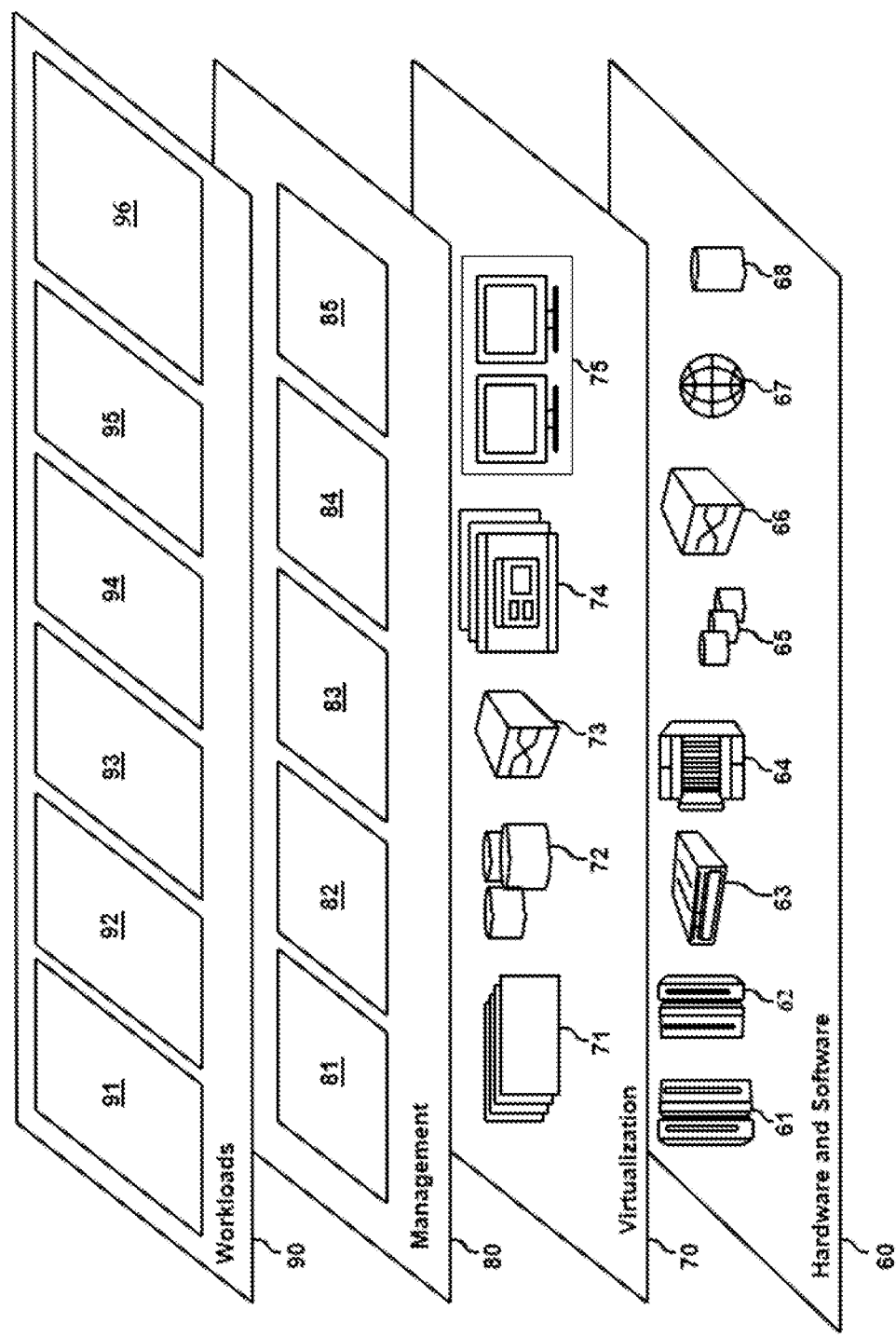
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and container image migration service 96.

With reference now to FIG. 4 to FIG. 9, embodiments of the invention will be described.

Figure 4:
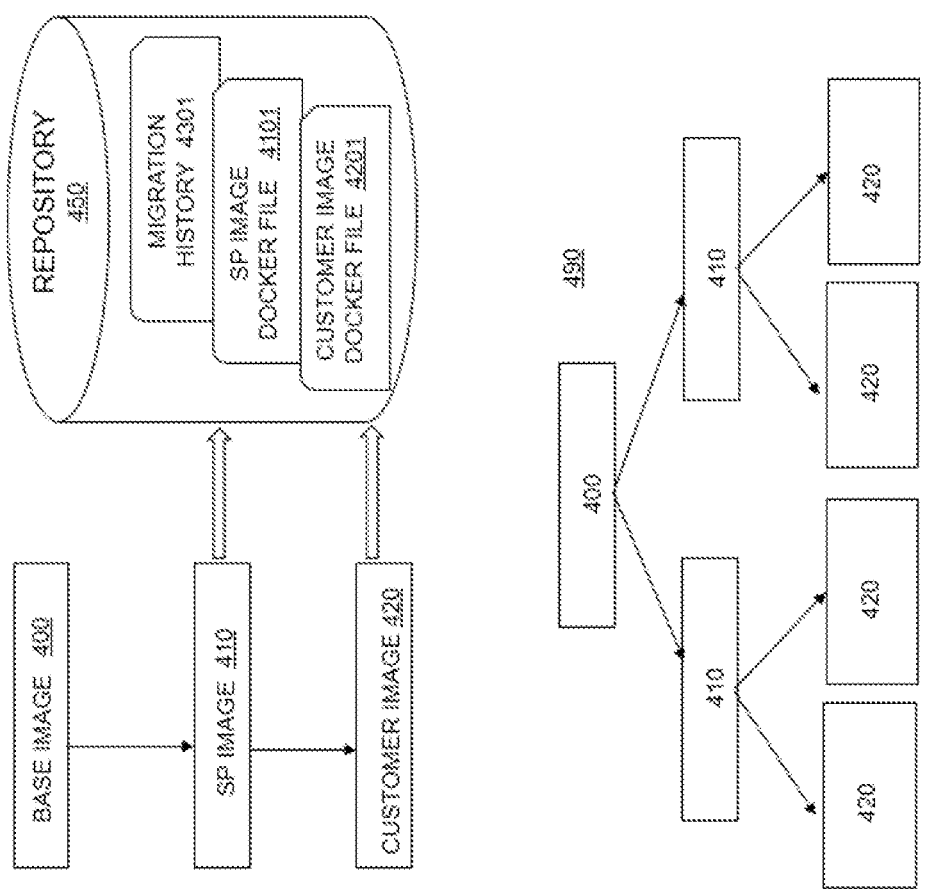
FIG. 4 illustrates image hierarchy in a cloud environment in which embodiments of the invention may be implemented.

FIG. 4 illustrates image hierarchy in a cloud environment in which embodiments of the invention may be implemented. Referring to FIG. 4, three Docker image types at different hierarchical levels, namely a base image 400, a service provider (SP) image 410 and a customer image 420 are shown. SP image 410 may be built based on base image 400. Examples of base image 400 include Alpine and Red Hat Universal Base Image® (UBI) (Red Hat Universal Base Image and all Red Hat Universal Base Image-based trademarks and logos are trademarks or registered trademarks of Red Hat, Inc. and/or its affiliates). Customer image 420 may be built based on SP image 410. SP image 410 may be built and owned by a cloud service provider for providing services and may comprise image layers such as kernel layer, middleware layer and infrastructure software layer (not shown). Examples of SP image include IBM® MQ (IBM and all IBM-based trademarks and logos are trademarks or registered trademarks of International Business Machines Corporation and/or its affiliates), and IBM® Websphere Liberty. Docker files 4101 of SP image 410 may be maintained in a repository 450 in a cloud environment accessible by the service provider. Customer image 420 may be created/owned by a customer or user of the cloud services based on SP image 410 and may comprise image layers such as kernel layer, middleware layer and application layer. Docker files 4102 of customer image 420 may also be maintained in repository 450 and may be accessible by the service provider as well as their owners. Some Docker files may be associated with public images and sharable among registered customers of the cloud service. The hierarchical relationship is conceptually shown at 490 in FIG. 4.

Figure 5:
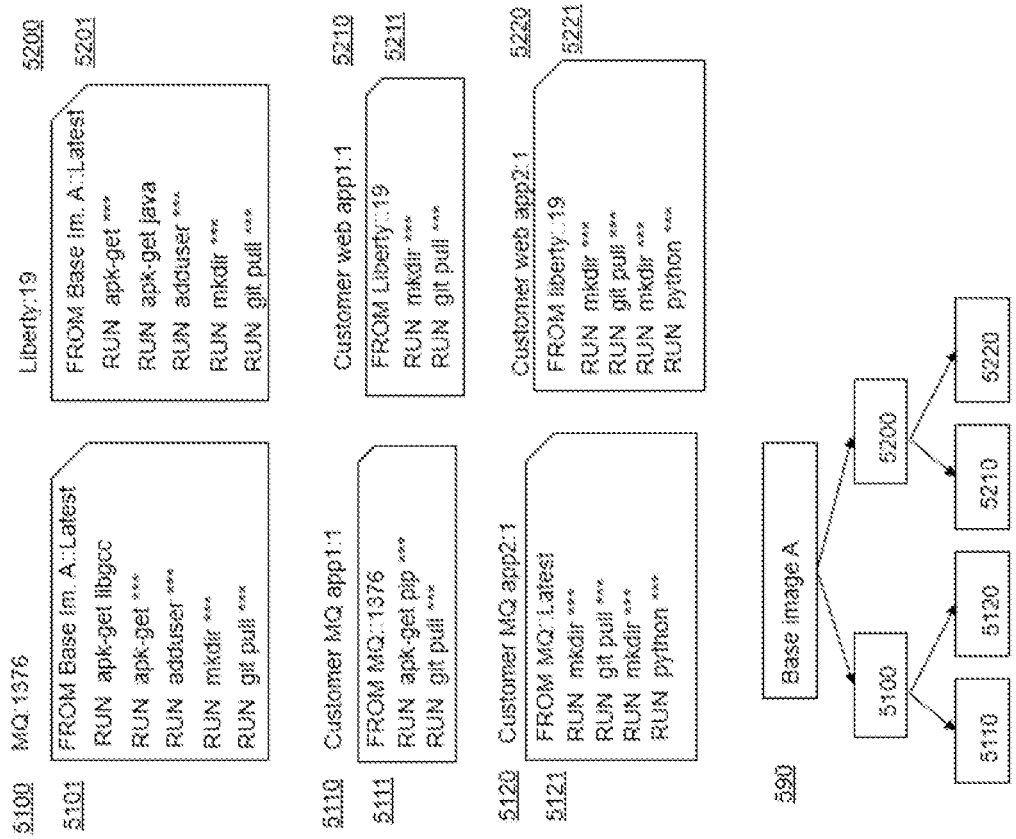
FIG. 5 depicts some illustrative container images and associated Docker files.

FIG. 5 depicts some illustrative container images and associated Docker files. Referring to FIG. 5, two SP images are shown. The first SP image 5100 may be designated "MQ: 1376", which is an image name "MQ" tagged with a version number ("1376") following a colon mark ":". The second SP image 5200 may be "Liberty: 19".

SP image 5100 may be defined by a Docker file 5101 consisting of instructions. For instance, Docker file 5101 may comprise a FROM instruction "FROM Base image A::Latest", meaning that image 5100 is built based on the latest version of Base image A, which is a base image such as base image 400 illustrated in FIG. 4. Docker file 5101 may also comprise RUN instructions that form different layers of image 5100. Each RUN instruction consists of one or more commands. For example, instruction "RUN apk-get libgcc" may comprise a command such as "apk-get libgcc".

SP image 5200 may be defined by a Docker file 5201. Docker file 5201 comprises a FROM instruction "FROM Base image A::Latest", meaning that image 5200 may be built based on the latest version of Base image A.

In FIG. 5, four customer images 5110, 5120, 5210 and 5220 are also shown. Customer image "Customer MQ app1:1" 5110 may be built based on SP image 5100, as indicated by the FROM instruction "FROM mq::1376" in its Docker file 5111. Similarly, customer image "Customer MQ app1:1" 5120 may built based on mq::Latest, as indicated by the FROM instruction "FROM mq::Latest" in its Docker file 5121. "mq::Latest" and "mq::1376" may be two different versions of the MQ image.

Customer images "Customer web app1:1" 5210 and "Customer web app2:1" 5220 may be respectively defined by Docker file 5211 and Docker file 5221. Both images may be built based on SP image 5200, as indicated by the FROM instruction "FROM Liberty::19" in their Docker files.

The relationship of the images may be represented by a dependency tree 590. In dependency tree 590, node 5100 and node 5200 may be child nodes of Base image A. Node 5100 may be the father node of sibling nodes 5110 and 5120. Node 5200 may be the father node of sibling nodes 5210 and 5220. It is to be noted that nodes 5100 and 5200 respectively may represent two SP images, regardless their versions.

Figure 6A:
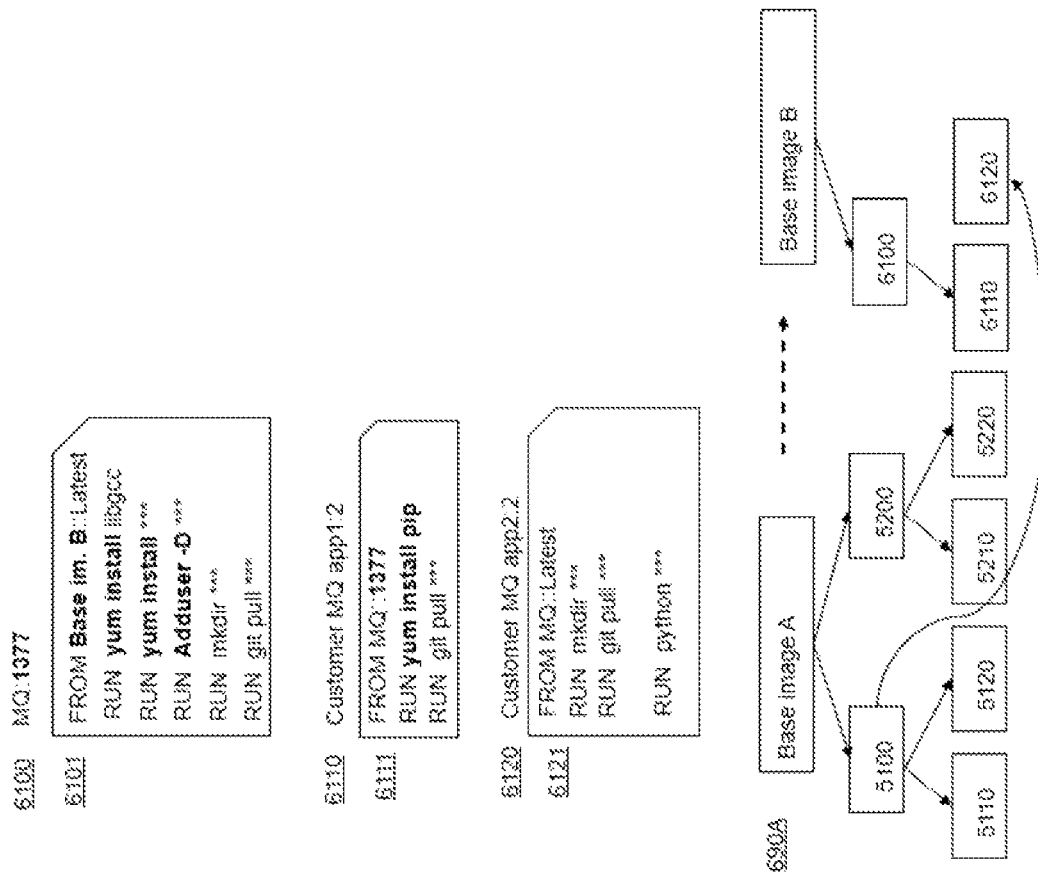
FIG. 6A and FIG. 6B illustrate an exemplary image update and image migration with regard to the images shown in FIG. 5.

Turn to FIG. 6A, which illustrates exemplary image update and image migration with regard to the images shown in FIG. 5. Three images 6100, 6110 and 6120 are depicted in FIG. 6A. Image 6100 ("MQ:1377") may be a different version of image 5100 ("MQ:1376") in FIG. 5. Image 6110 ("Customer MQ app1:2") may be a different version of image 5110 ("Customer MQ app1:1") in FIG. 5, and image 6120 ("Customer MQ app1:2") may be a different version of image 5120 ("Customer MQ app1:1") in FIG. 5.

The content of Docker file 6101 of image 6100 may be changed from Docker file 5101 of image 5100. The FROM instruction "FROM Base image A::Latest" in Docker file 5101 is changed to "FROM Base image B::Latest" in Docker file 6101. Since Base image A and Base image B may be of different base image systems, this situation is called image migration. Image 5100 may be migrated to image 6100. Image 6100 ("mq::1377") is referred to as a migration image.

The content of Docker file 6111 of image 6110 may be changed from Docker file 5111 of image 5110. Specifically, the FROM instruction "FROM mq::1376" in Docker file 5111 may be changed to "FROM mq::1377" in Docker file 6111. As mentioned in the above, image 6100 ("mq::1377") may now be a migration image of image 5100 ("mq::1376") in FIG. 5. Therefore, Image 5110 may be migrated to image 6110 ("Customer MQ app1:2"), which is a migration image.

The content of Docker file 6121 of image 6120 may be changed from Docker file 5121 of image 5120. Compared to Docker file 5121, the second RUN instruction "RUN mkdir *" may no longer exist in Docker file 6121. However, the FROM instruction "FROMMQ::Latest" in Docker file 6121 may be the same as the FROM instruction "FROMMQ:: Latest" in Docker file 5121. In this situation, the version update of image 5120 to image 6120 may involve an image update. But it may not involve image migration. In other words, image 5120 may be updated to image 6120 rather than migrated to 6210**.

After migration of image 5100 and image 5110 and update of images 5120, the relationship of migration image 6100, migration image 6110 and updated image 6120 is shown in dependency tree 690A. As shown, migration image 6110 may be a child of migration image 6100, i.e. Base image B, which is migrated from Base image A as indicated by a dotted arrow line. Image 6120, which may be a new version of image 5120, may remain a child of image 5100.

Figure 6B:
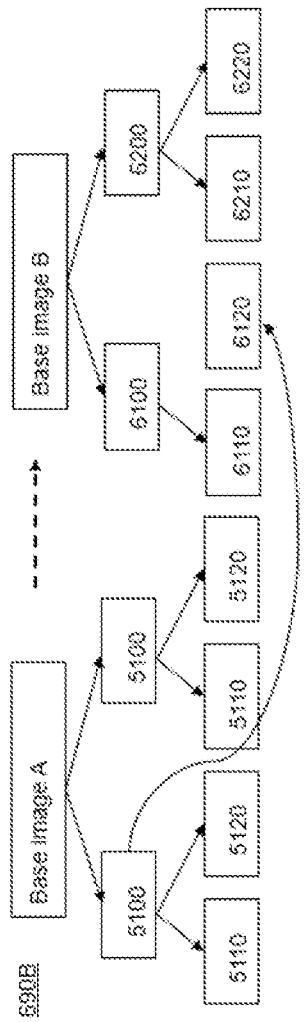

FIG. 6B illustrates further examples of image update and image migration with regard to the images shown in FIG. 5. Compared to FIG. 6A, additional three images 6200, 6210 and 6220 are depicted in FIG. 6B. They may be, respectively, new versions of images 5200, 5210, and 5220. Specifically, Docker files 5201, 5211 and 5221, respectively, associated with images 5200, 5210, and 5220 (FIG. 5) may be changed to Docker files 6201, 6211 and 6221, respectively, associated with images 6200, 6210 and 6220. Images 6200, 6210 and 6220 may be, respectively, new versions of images 5200, 5210, and 5220. From the FROM instructions of Docker files 6201, 6211 and 6221, it may be determined that images 6200, 6210 and 6220 are all migration images.

The relationship of the migration images 6200, 6210 and 6220 is shown in dependency tree 690B, which is expanded from dependency tree 690A in FIG. 6A. As shown, migration images 6210 and 6220 may be children of migration image 6200, i.e., Base image B, which may be migrated from Base image A.

Having discussed some basic concepts relevant to the invention, embodiments of the invention will be given with reference to further drawings. Embodiments of the invention address image migration service. As mentioned in the Background, an SP image (e.g., image 5100, FIG. 5) may be based on some base image (e.g., image 500 in FIG. 5). If the base image is changed (e.g. from image 500 to image 600 in FIG. 6A), the SP image may be migrated. Consequently, all dependent customer images (e.g., image 5110) may have to be migrated sooner or later. According to embodiments of the invention, if some users have migrated their images, other users that have not yet migrated their images may be advantageously advised how to migrate their images based on the migration history of those having migrated their images.

Figure 7B:
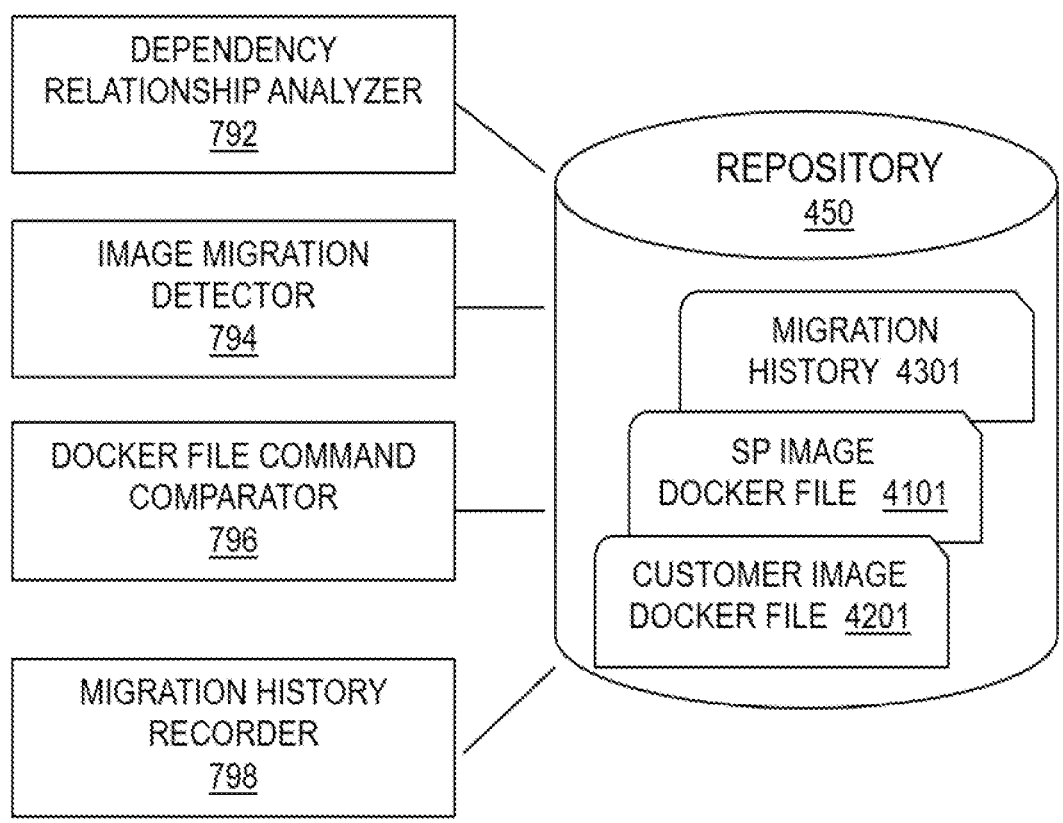
FIG. 7B is a block diagram of some functional modules configured to implement the steps of the method according to an embodiment of the invention.

Now turn to FIG. 7A and FIG. 7B. FIG. 7A is a flowchart of general process of a method 700 according to an embodiment of the invention. FIG. 7B is a block diagram of some functional modules configured to implement the steps of method 700 according to an embodiment of the invention. Referring to FIG. 7B, a dependency relationship analyzer 792, an image migration detector 794, a Docker file command comparator 796, and a migration history recorder 798 are shown.

According to an embodiment of the invention, dependency relationship analyzer 702 may be configured to determine a dependency relationship of container images in image repository 450. As discussed with respect to FIG. 4, FIG. 5, FIG. 6A and FIG. 6B, the dependency relationship of container images may be represented by an image dependency tree such as image dependency trees 490, 590, 690A and 690B. In an image dependency tree, father-child image relations may be established by parsing FROM instructions in Docker files 4101, 4201, for example. Images of different versions may be sorted in the order of version number, so as to easily locate any version of an image. Dependency relationship analyzer 702 may scan Docker files 4101 and 4201 and these Docker files may be stored in image repository 450 to establish a logical image dependency tree for all SP container images and customer container images stored in image repository 450. Every time a new image is stored into image repository 450, dependency relationship analyzer 702 may reconstruct the image dependency tree to accommodate the new image.

According to an embodiment of the invention, image migration detector 794 may be configured to determine whether an image is a migration image when it is being stored into image repository 450. For example, as previously discussed with regard to FIG. 6A, image 6110 may be a new version (version 2) of the image named "customer MQ app1" over an earlier version (version 1) of image 5110. After the owner of image 6110 creates the new version, the owner may store it into image repository 450. Image migration detector 794 may identify the incoming image 6110 and, may determine whether the new version is a migration image based on the FROM instruction in Docker file 6111 of image 6110 and Docker file 5111 of image 5110.

According to an embodiment of the invention, Docker file command comparator 796 may be configured to compare commands of one Docker file with another to determine a difference in the commands.

As is known in the art, Docker file commands may be layer-wise organized and image layers may be defined with RUN instructions. According to an embodiment of the invention, Docker file command comparator 796 may be configured to compare Docker file commands on a layer basis. According to another embodiment of the invention, Docker file command comparator 796 may be configured to compare Docker file commands on a command basis. Where a RUN instruction comprises a compound command consisting of two or more commands combined with "&&", Docker file command comparator 796 may be configured to split the compound command into single commands to facilitate comparison. Thus, Docker file command comparator 796 may be configured to compare Docker file commands of one image (e.g. 5110 in FIG. 5) with Docker file commands of another image (e.g. 5120 in FIG. 5). Docker file command comparator 796 may be further configured to compare Docker file commands of one version of an image (e.g. 5120 in FIG. 5) with another version of the image (e.g. 6120 in FIG. 6A). Docker file command comparator 796 may be further configured to compare Docker file commands of a migration image (e.g. 6110 in FIG. 6) and Docker file commands of the last version of the migration image (e.g., 5110 in FIG. 5).

According to an embodiment of the invention, migration history recorder 798 may be configured to record migration history of the SP container image and customer container image. The information in the migration history may comprise, for example, the last version of an image before it migrates to a migration image. The information may further comprise a mapping relationship of prior-to-migration layers and post-migration layers. The information may further comprise a mapping relationship of prior-to-migration commands and post-migration commands.

Turn to FIG. 7A, method 700 provides container image migration service based on a cloud container image repository (also referred to "image repository" or "repository" hereinafter) 450. Image repository 450 may comprise Docker files 4101, 4201 of provider service (SP) container images (also referred to as "SP images" or "images"), customer container images (also referred to as "customer images" or "images"), and image migration data such as migration history 4301. The method comprises the following general Steps 710, 720, 730 and 740.

Step 710 involves identifying a latest version of a first customer container image stored in a container image repository. This step may be performed by dependency relationship analyzer 792. Every time a new customer image is stored into repository 450, it may be identified by dependency relationship analyzer 792.

Step 720 involves determining the latest version of the first customer container image is a migration image from a last version of the first customer image. This step may be performed by image migration detector 794.

Figure 8A:
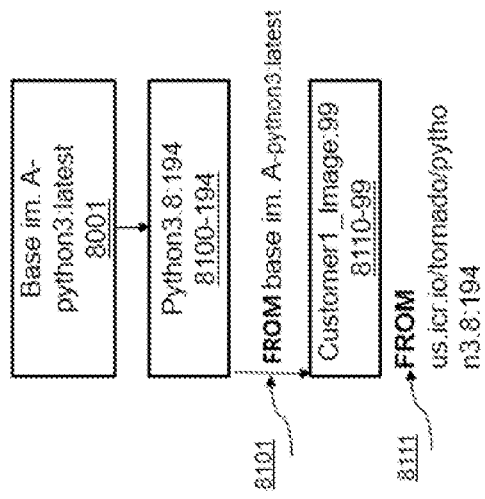
FIGS. 8A to 8C depict partial image dependency trees representing image relationships in connection with the method according to embodiments of the invention.

Refer to FIG. 8A, which depicts an image dependency tree 801, which may be a subtree of a larger image dependency tree (not shown) that may be constructed by image dependency analyzer 792 in FIG. 7B. Specifically, image dependency tree 801 shows a version of a first customer container image "Customer1_Image", namely "Customer1_Image:99" 8110-99. Image 8110-99 may be built based on a SP container image "Python3.8:194" 8100-194, as indicated by the FROM instruction 8111 of the Docker file of image 8110-99. Image 8100-194 may be built based on image 8001 which may be base image "Base image A-python3", as indicated by the FROM instruction 8101 of the Docker file of image 8110-194.

Figure 8B:
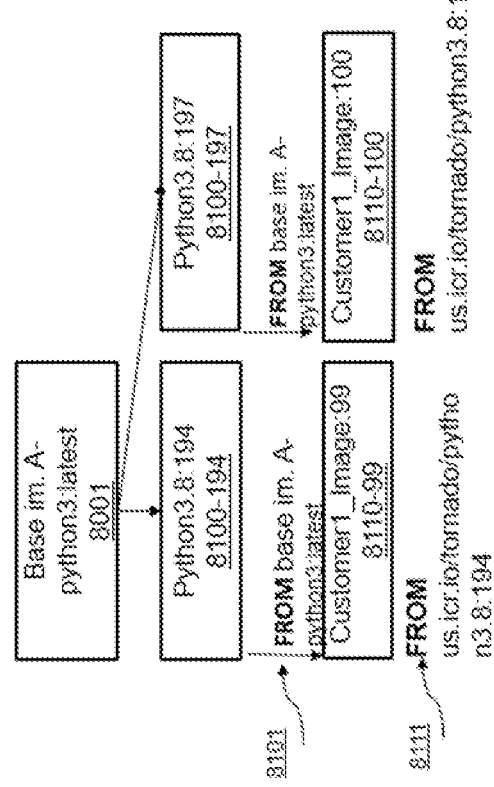

Assume a "Customer1_Image" 8110-100 is stored into image repository 450. As shown in FIG. 8B, image dependency tree 801 may be expanded to image dependency tree 802 by dependency relationship analyzer 792. Image 8110-100 is a new version of image 8110-99, and may be built based on SP container image "Python3.8:197" 8100-197. In Step 710, Image 8110-100 may be identified to be the latest version of the first customer container image according to its version number. However, image 8110-100 may not be a migration image.

Figure 8C:
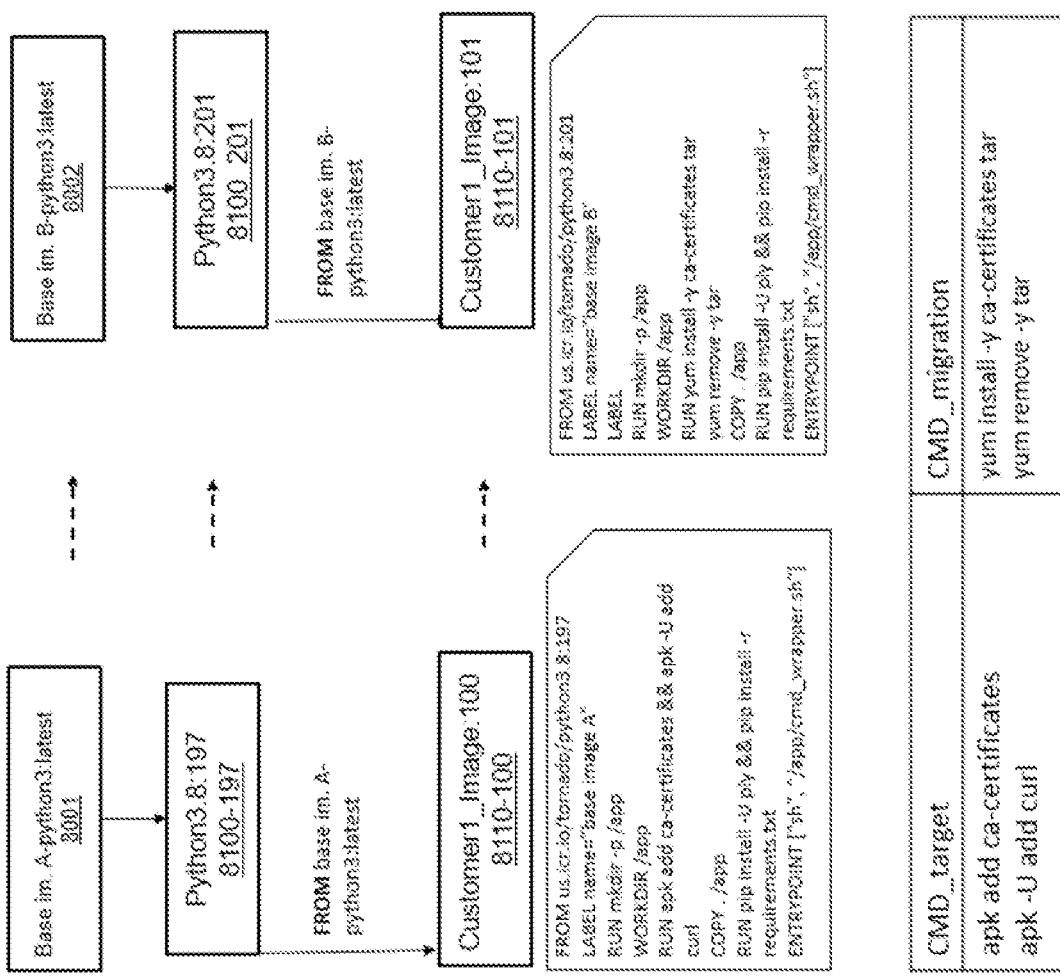

Turn to FIG. 8C, assuming next time an image "Customer1_Image" 8110-101 is stored into image repository 450, image dependency tree 802 may be expanded to include image 8110-101 as shown in FIG. 8C.

Step 710 may identify that image 8110-101 is the latest version of the first container image "Customer1_Image". Here, image 8110-101 may be built based on SP container image "Python3.8:201" 8100-201. Step 720 may determine that image 8110-101 may be a migration image migrated from a last version of the first customer image. Specifically, image migration detector 794 may determine that image 8110-101 may be a migration image based on the FROM instruction of its Docker file, which reads: FROM us.icr.io/tornado/python3.8:201 LABEL name="base image B". So, image migration detector 794 may detect migration of the first customer container image "Customer1_Image". The migration is illustratively shown by a dotted arrow line from the last version (version 100) of customer container image "Customer1_image".

Image migration detector 794 may further determine that SP container image 8100-201 may be a migration image based on the FROM instruction of its Docker file, which reads: FROM Base image B-python3:latest.

According to an embodiment of the invention, based on the determination of image migration of the SP container image and the first customer container image, it may be determined that migration of the first customer container image may be to adapt to migration of a service provider container image. Thus, migration of the first customer container image in order to adapt to migration of a service provider container image may be detected.

After Step 720, Step 730 is performed, which involves determining a set of commands in the Docker file of the last version of the first customer container image that has migrated to a corresponding set of commands in the Docker file of the migration image.

According to an embodiment of the invention, the set of commands may be determined by comparing the Docker file of the migration image of the first customer container image with the Docker file of the last version of the migration image. This may be performed by Docker file command comparator 796.

In the example shown in FIG. 8C, the Docker file of the migration image 8110-101 of the first customer container image may be the following, for example:
FROM us.icr.io/tornado/python3.8:201
LABEL name="base image B"
LABEL
RUN mkdir -p/app
WORKDIR/app
RUN yum install -y ca-certificates tar
yum remove -y tar
COPY. /app
RUN pip install -U ply && pip install -r requirements.txt
ENTRYPOINT ["sh", "/app/cmd_wrapper.sh"]

The Docker file of the last version image 8110-100 of the migration image may be the following, for example:
FROM us.icr.io/tornado/python3.8:197
LABEL name="base image A"
RUN mkdir -p/app
WORKDIR/app
RUN apk add ca-certificates && apk -U add curl
COPY. /app
RUN pip install -U ply && pip install -r requirements.txt
ENTRYPOINT ["sh", "/app/cmd_wrapper.sh"]

Docker file command comparator 796 may determine that a set of commands in the Docker file of the last version image 8110-100 of the migration image, denoted as CMD_target, has migrated to a corresponding set of commands in the Docker file of the migration image 8110-101, denoted as CMD_migration:
CMD_target={apk add ca-certificates, apk -U add curl}
CMD_migration={yum install -y ca-certificates tar, yum install -y ca-certificates tar}

The two command sets, CMD_target and CMD_migration, are also illustrated in FIG. 8C. According to an embodiment of the invention, CMD_target and CMD_migration may be stored in migration history 4301 (FIG. 7B). The information may be used for image migration service for other customer images.

Then, Step 740 is performed, which involves identifying the latest version of a second customer container image having at least one Docker file command in common with at least one command in the set of commands.

Figure 9:
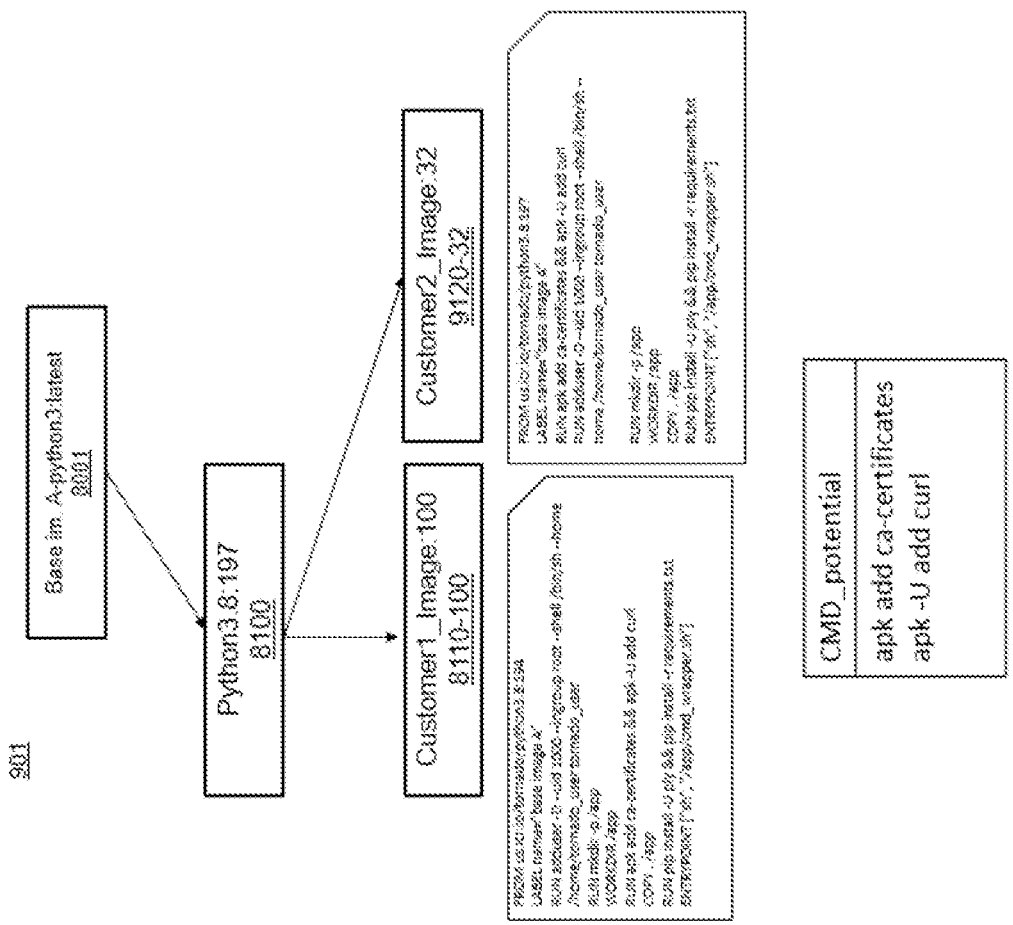
FIG. 9 depicts a partial image dependency tree representing an image relationship in connection with the method according to embodiments of the invention.

The operation of Step 740 is illustrated in FIG. 9. FIG. 9 shows an image dependency tree 901 which may be a subtree of a larger image dependency tree (not shown) constructed by dependency relationship analyzer 792 (FIG. 7B). Specifically, image dependency tree 901 shows a customer container image "Customer2_Image:32" 9120-32, which may be determined to be the latest version of a second customer container image "Customer2_Image" by dependency relationship analyzer 792. Image 9120-32 may be dependent on SP container image "Python3.8:197" 8100. Image dependency tree 901 also shows the first customer container image "Customer1_Image:100" 8110-100 to show its relationship with image 9120-32. The first image 8110-100 and the second image 9210-32 may be dependent on a same SP image 8100, but they may be different images and may be owned by different customers of the cloud service.

The Docker file of the image 9120-32 may be the following, for example:
FROM us.icr.io/tornado/python3.8:197
LABEL name="base image A"
RUN apk add ca-certificates && apk -U add curl
RUN adduser -D --uid 1000 --ingroup root --shell /bin/sh --home /home/tornado_user tornado_user
RUN mkdir -p /app
WORKDIR /app
COPY. /app
RUN pip install -U ply && pip install -r requirements.txt
ENTRYPOINT ["sh", "/app/cmd_wrapper.sh"]

According to an embodiment of the invention, the Docker file of image 9120-32 may be compared with the command set CMD_target by Docker file command comparator 796 to determine whether the Docker file of image 9120-32 and the command set CMD_target have at least one command in common. In the instant example, it turns out that there may be two commands, "apk add ca-certificates" and "apk -U add curl," in common. The comparison result may be denoted as:

CMD_potential={apk add ca-certificates, apk -U add curl} wherein CMD_potential may represent the at least one command both in the set of commands CMD_target and the Docker file of the second customer container image 9210-32.

In the instant example, the first customer image Cutomer1_Image and the second customer container image Cutomer2_Image may be dependent on the same (SP) container image Python3.8. Since the SP container image Python3.8 has migrated from "Python3.8:197" 8100-197 to "Python3.8:201" 8100-201, all customer container images may have to migrate sooner or later. In the description, the first customer container image may be representative of a number of customer container images that have migrated earlier, and the second customer container image may be representative of a number of customer container images that may eventually migrate at a later time. It is contemplated that the migration path of the first image may be leveraged to reduce the effort of the owner of the second image in preparing for imminent migration of the second image.

Therefore, after Step 740, Step 750 is performed, which involves recommending imminent migration of the second customer container image to include migration of the at least one Docker file command. In other words, based on the output of the previous steps, the second customer container image may be similar to the first image in one or more aspects. Since the first image has migrated, and the set of commands CMD_target of the first image have migrated, the at least one Docker file command CMD_potential may potentially also need migration in the imminent migration of the second image. Therefore, with Step 740, effort in preparing for migration of the second image may be alleviated at least in identifying potential commands needing migration.

According to an embodiment of the invention, when recommending imminent migration of the second customer container image to include migration of the at least one Docker file command, the set of commands in the Docker file of the last version of the first customer container image CMD_target and the corresponding set of commands in the Docker file of the migration image CMD_migration may also be provided. The mapping relationship of CMD_target and CMD_migration may be helpful for determining how to deal with CMD_potential in imminent migration of the second image.

Embodiments of the process of method 700 for container image migration service are described above. It is to be noted that the process may be repeated for a number of customer container images like the first image and the second image. And migration history information such as CMD_target and CMD_migration may be employed depending on the situation, as shall be readily practiced. The method may be provided by a cloud service provider for owners of customer containers in preparing for migration of container images.

It should be noted that the processing of container image migration service according to embodiments of this disclosure could be implemented by computer system/server 12 of FIG. 1.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method, comprising:
identifying, by one or more processing units, a latest version of a first customer container image owned by one user stored in a container image repository;
determining, by one or more processing units, the latest version of the first customer container image is a migration image from a last version of the first customer container image, wherein the last version of the first customer container image has a different base image than the latest version of the first customer container image;
determining, by one or more processing units, a set of commands in the Docker file of the last version of the first customer container image that have migrated to a corresponding set of commands in the Docker file of the migration image by comparing each command, including all run commands, in the Docker file of the migration image with each command in the Docker file of the last version of the first customer container image, wherein the set of commands in the Docker file of the last version of the first customer container image Docker file include at least one run command that is distinct from the corresponding set of commands in the Docker file of the migration image;
identifying, by one or more processing units, a latest version of a second customer container image owned by a different user having at least one Docker file command in common with at least one command in the set of commands in the Docker file of the last version of the first customer container image; and
recommending, by one or more processing units, imminent migration of the second customer container image to include migration of the at least one Docker file command in common.

2. The method of claim 1, wherein the first customer container image and the second customer container image are dependent on a same service provider (SP) container image.

3. The method of claim 2, further comprising:
storing, by one or more processing units, the set of commands in association with the corresponding set of commands as migration history.

4. The method of claim 2, further comprising:
determining, by one or more processing units, the migration image is resulted from migration of the last version of the first customer container image in order to adapt to migration of the SP container image.

5. The method of claim 3, wherein the recommending imminent migration of the second customer container image to include migration of the at least one Docker file command further comprises:
providing, by one or more processing units, the set of commands in the Docker file of the last version of the first customer container image and the corresponding set of commands in the Docker file of the migration image.

6. The method of claim 5, wherein the set of commands in the Docker file of the last version of the first customer container image and the corresponding set of commands in the Docker file of the migration image are obtained from the migration history.

7. The method of claim 1, further comprising:
establishing, by one or more processing units, a relationship of container images in the container image repository based on version numbers of the container images and Docker files of the container images,
wherein the migration image is determined based on the relationship of the container images.

8. A system, comprising:
a processor; and
a memory containing a program that, when executed on the processor, performs an operation, the operation comprising:
identifying, by one or more processing units, a latest version of a first customer container image owned by one user stored in a container image repository;
determining, by one or more processing units, the latest version of the first customer container image is a migration image from a last version of the first customer container image wherein the last version of the first customer container image has a different base image than the latest version of the first customer container image;
determining, by one or more processing units, a set of commands in the Docker file of the last version of the first customer container image that have migrated to a corresponding set of commands in the Docker file of the migration image by comparing each command, including all run commands, in the Docker file of the migration image with each command in the Docker file of the last version of the first customer container image, wherein the set of commands in the Docker file of the last version of the first customer container image Docker file include at least one run command that is distinct from the corresponding set of commands in the Docker file of the migration image;
identifying, by one or more processing units, a latest version of a second customer container image owned by a different user having at least one Docker file command in common with at least one command in the set of commands in the Docker file of the last version of the first customer container image; and
recommending, by one or more processing units, imminent migration of the second customer container image to include migration of the at least one Docker file command in common.

9. The system of claim 8, wherein the first customer container image and the second customer container image are dependent on a same service provider (SP) container image.

10. The system of claim 9, the operation further comprising:
storing the set of commands in association with the corresponding set of commands as migration history.

11. The system of claim 9, the operation further comprising:
determining the migration image is resulted from migration of the last version of the first customer container image in order to adapt to migration of the SP container image.

12. The system of claim 10, wherein the recommending imminent migration of the second customer container image to include migration of the at least one Docker file command further comprises:
providing the set of commands in the Docker file of the last version of the first customer container image and the corresponding set of commands in the Docker file of the migration image.

13. The system of claim 12, wherein the set of commands in the Docker file of the last version of the first customer container image and the corresponding set of commands in the Docker file of the migration image are obtained from the migration history.

14. The system of claim 8, the operation further comprising:
establishing a relationship of container images in the container image repository based on version number of the container images and Docker files of the container images,
wherein the migration image is determined based on the relationship of the container images.

15. A non-transitory computer program product comprising:
a computer-readable storage medium having computer-readable program code embodied therewith, the computer-readable program code executable by one or more computer processors to perform an operation, the operation comprising:
identifying, by one or more processing units, a latest version of a first customer container image owned by one user stored in a container image repository;
determining, by one or more processing units, the latest version of the first customer container image is a migration image from a last version of the first customer container image, wherein the last version of the first customer container image has a different base image than the latest version of the first customer container image;
determining, by one or more processing units, a set of commands in the Docker file of the last version of the first customer container image that have migrated to a corresponding set of commands in the Docker file of the migration image by comparing each command, including all run commands, in the Docker file of the migration image with each command in the Docker file of the last version of the first customer container image, wherein the set of commands in the Docker file of the last version of the first customer container image Docker file include at least one run command that is distinct from the corresponding set of commands in the Docker file of the migration image;
identifying, by one or more processing units, a latest version of a second customer container image owned by a different user having at least one Docker file command in common with at least one command in the set of commands in the Docker file of the last version of the first customer container image; and
recommending, by one or more processing units, imminent migration of the second customer container image to include migration of the at least one Docker file command in common.

16. The non-transitory computer program product of claim 15, wherein the first customer container image and the second customer container image are dependent on a same service provider (SP) container image.

17. The non-transitory computer program product of claim 16, the operation further comprising:
storing the set of commands in association with the corresponding set of commands as migration history.

18. The non-transitory computer program product of claim 16, the operation further comprising:
determining the migration image is resulted from migration of the last version of the first customer container image in order to adapt to migration of the SP container image.

19. The non-transitory computer program product of claim 17, wherein the recommending imminent migration of the second customer container image to include migration of the at least one Docker file command further comprises:
providing the set of commands in the Docker file of the last version of the first customer container image and the corresponding set of commands in the Docker file of the migration image.

20. The non-transitory computer program product of claim 19, wherein the set of commands in the Docker file of the last version of the first customer container image and the corresponding set of commands in the Docker file of the migration image are obtained from the migration history.

* * * * *